United States Patent
Komatsubara et al.

(10) Patent No.: US 9,353,790 B2
(45) Date of Patent: May 31, 2016

(54) FLUID DYNAMIC BEARING DEVICE AND MOTOR WITH SAME

(71) Applicants: Shinji Komatsubara, Mie (JP); Tetsuya Kurimura, Mie (JP)

(72) Inventors: Shinji Komatsubara, Mie (JP); Tetsuya Kurimura, Mie (JP)

(73) Assignee: NTN CORPORATION, Osaka (JP)

( * ) Notice: Subject to any disclaimer, the term of this patent is extended or adjusted under 35 U.S.C. 154(b) by 1 day.

(21) Appl. No.: 14/405,224

(22) PCT Filed: May 22, 2013

(86) PCT No.: PCT/JP2013/064178
§ 371 (c)(1),
(2) Date: Dec. 3, 2014

(87) PCT Pub. No.: WO2013/190942
PCT Pub. Date: Dec. 27, 2013

(65) Prior Publication Data
US 2015/0147010 A1 May 28, 2015

(30) Foreign Application Priority Data
Jun. 18, 2012 (JP) .................... 2012-136834

(51) Int. Cl.
*F16C 17/10* (2006.01)
*H02K 7/08* (2006.01)
(Continued)

(52) U.S. Cl.
CPC ............ *F16C 17/107* (2013.01); *F16C 17/10* (2013.01); *F16C 32/0659* (2013.01); *H02K 7/08* (2013.01); *F16C 33/107* (2013.01); *F16C 33/74* (2013.01); *F16C 2370/12* (2013.01)

(58) Field of Classification Search
CPC ....... F16C 17/10; F16C 17/107; F16C 17/102; F16C 33/107; F16C 33/745; F16C 2370/12; H02K 7/08
See application file for complete search history.

(56) References Cited

U.S. PATENT DOCUMENTS 5,623,382 A * 4/1997 Moritan ............... F16C 17/107
  310/51
5,715,116 A * 2/1998 Moritan ............... F16C 17/02
  310/67 R (Continued)

FOREIGN PATENT DOCUMENTS

| JP | 2003-336636 | 11/2003 |
| JP | 2007-24089 | 2/2007 |
| JP | 2007-162759 | 6/2007 |

OTHER PUBLICATIONS

International Search Report issued Jul. 30, 2013 in International (PCT) Application No. PCT/JP2013/064178.

(Continued)

*Primary Examiner* — Alan B Waits
(74) *Attorney, Agent, or Firm* — Wenderoth, Lind & Ponack, L.L.P.

(57) ABSTRACT

A fluid dynamic bearing device (1), including: a bearing member (22) on a rotary side; a housing (7) on a stationary side; a sealing member (9); a radial bearing gap to be formed between an outer peripheral surface (22a) of the bearing member (22) and an inner peripheral surface (7a2) of the housing (7); and a thrust bearing gap to be formed between a lower end surface (22c) of the bearing member (22) and an inner bottom surface (7b1) of the housing (7). The radial bearing gap and the thrust bearing gap are filled with lubricating oil (11). An axial gap (10) containing air is formed between an upper end surface (22b) of the bearing member (22) and a lower end surface (9b) of the sealing member (9), which faces the upper end surface (22b) of the bearing member (22).

10 Claims, 5 Drawing Sheets

(51) Int. Cl.
*F16C 32/06* (2006.01)
*F16C 33/74* (2006.01)
*F16C 33/10* (2006.01)

(56) References Cited

U.S. PATENT DOCUMENTS

| | | | | |
|---|---|---|---|---|
| 6,390,681 | B1* | 5/2002 | Nakazeki | F16C 17/107 384/107 |
| 6,933,642 | B2* | 8/2005 | Kusaka | F16C 17/026 310/90.5 |
| 7,095,147 | B2* | 8/2006 | Aiello | F16C 17/02 310/90 |
| 7,241,050 | B2* | 7/2007 | Uenosono | F16C 17/107 384/107 |
| 7,513,688 | B2* | 4/2009 | Uenosono | F16C 17/107 384/100 |
| 7,527,432 | B2* | 5/2009 | Asada | F16C 17/107 384/107 |
| 7,564,155 | B2* | 7/2009 | Chiyoda | F16C 17/10 310/90 |
| 8,300,355 | B2* | 10/2012 | Yang | F16C 17/107 360/271.3 |
| 8,304,946 | B2* | 11/2012 | Yu | F16C 17/107 310/90 |
| 8,562,221 | B2* | 10/2013 | Kim | F16C 33/745 384/100 |
| 9,047,910 | B2* | 6/2015 | Oh | F16C 17/107 |
| 2002/0051588 | A1 | 5/2002 | Koseki et al. | |
| 2006/0252659 | A1* | 11/2006 | Kinoshita | C10M 105/74 508/433 |
| 2007/0098310 | A1* | 5/2007 | Hong | F16C 17/10 384/100 |
| 2007/0133911 | A1 | 6/2007 | Nishimoto et al. | |
| 2008/0279493 | A1* | 11/2008 | Masazuki | F16C 33/1085 384/100 |
| 2008/0304775 | A1* | 12/2008 | Asada | F16C 17/107 384/112 |
| 2012/0049676 | A1* | 3/2012 | Lee | F16C 33/1085 310/90 |
| 2013/0039609 | A1* | 2/2013 | Kim | F16C 17/107 384/112 |
| 2013/0051714 | A1* | 2/2013 | Jung | F16C 33/745 384/100 |
| 2013/0330029 | A1* | 12/2013 | Kwon | F16C 33/745 384/121 |
| 2015/0152916 | A1* | 6/2015 | Sugiki | F16C 33/107 384/112 |
| 2015/0323002 | A1* | 11/2015 | Jang | F16C 17/107 360/99.11 |

OTHER PUBLICATIONS

International Preliminary Report on Patentability and Written Opinion of the International Searching Authority issued Dec. 23, 2014 in corresponding International Application No. PCT/JP2013/064178.
Extended European Search Report issued Feb. 12, 2016 in corresponding European Patent Application No. 13807559.3.

* cited by examiner

FLUID DYNAMIC BEARING DEVICE AND MOTOR WITH SAME

TECHNICAL FIELD

The present invention relates to a fluid dynamic bearing device and a motor including the fluid dynamic bearing device.

BACKGROUND ART

As is well known, fluid dynamic bearing devices have features in their high speed rotation, high rotational accuracy, quietness, and the like. Thus, the fluid dynamic bearing devices are suitably used as bearing devices for motors to be mounted to various electrical apparatus such as information apparatus, and more specifically, as bearing devices for spindle motors to be built in disk drives of HDDs and the like, for fan motors to be built in PCs and the like, or for polygon scanner motors to be built in laser beam printers (LBPs).

The fluid dynamic bearing device includes radial bearing portions for supporting a member on a rotary side in a radial direction, and thrust bearing portions for supporting the member on the rotary side in thrust directions. In recent years, in order to effectively obtain the above-mentioned features, the radial bearing portions and the thrust bearing portions have each been formed of a fluid dynamic bearing in many cases. There have been proposed various fluid dynamic bearing devices of this type. For example, Patent Literature 1 discloses, in FIG. 2, a fluid dynamic bearing device including a sintered-metal bearing member on the rotary side, and a housing on the stationary side, which receives the bearing member on its inner periphery. Radial bearing gaps of radial bearing portions are formed between an outer peripheral surface of the bearing member and an inner peripheral surface of the housing. Further, in this fluid dynamic bearing device, thrust bearing gaps of thrust bearing portions are formed respectively on one end surface and another end surface of the bearing member.

When the configuration of Patent Literature 1 is employed, the support areas in the radial bearing portions can be set to be larger than those in a configuration in which the radial bearing gaps of the radial bearing portions are formed between an outer peripheral surface of a shaft member and an inner peripheral surface of the bearing member fixed to the inner periphery of the housing (for example, Patent Literature 2). In addition, due to a centrifugal force to be applied to lubricating oil along with rotation of the bearing member, the radial bearing gaps can be filled with an ample amount of the lubricating oil. Thus, there is an advantage in that supportability of the radial bearing portions can be enhanced and stably maintained.

CITATION LIST

Patent Literature 1: JP 2007-24089 A
Patent Literature 2: JP 2003-336636 A

SUMMARY OF INVENTION

Technical Problem

Incidentally, in the case where the thrust bearing gaps are formed respectively on the one end surface and the another end surface of the bearing member as in the fluid dynamic bearing device disclosed in Patent Literature 1, in order to prevent shortage of the oil film in both the thrust bearing gaps, an interior space of the housing needs to be filled with the lubricating oil. This necessity is apparent from the configuration in which an oil level of the lubricating oil is maintained within a range of a sealing gap that seals an opening portion of the housing (refer to paragraph of Patent Literature 1).

However, when the above-mentioned configuration is employed, after assembly of the bearing device, the interior space of the housing needs to be filled with the lubricating oil by a complicated process such as what is called vacuum impregnation, and the oil level of the lubricating oil needs to be managed with high accuracy (an amount of the lubricating oil needs to be finely adjusted). Thus, there has been pointed out a problem of a difficulty in satisfying the demand for further cost reduction of the fluid dynamic bearing device.

In view of the circumstances, it is an object of the present invention to provide a fluid dynamic bearing device that can be manufactured at low cost and exert desired bearing performance.

Solution to Problem

According to one embodiment of the present invention, which is devised to achieve the above-mentioned object, there is provided a fluid dynamic bearing device, comprising: a bearing member on a rotary side, the bearing member being made of a porous material and having end surfaces on both sides in an axial direction; a housing on a stationary side, the housing having a bottomed cylindrical shape closed on one side in the axial direction and being configured to receive the bearing member on an inner periphery of the housing; a sealing member arranged so as to face the end surface of the bearing member on another side in the axial direction and configured to open the another side of the bearing member in the axial direction to atmosphere through a sealing gap; a radial bearing gap to be formed between an outer peripheral surface of the bearing member and an inner peripheral surface of the housing; and a thrust bearing gap to be formed between the end surface of the bearing member on one side in the axial direction and an inner bottom surface of the housing, the radial bearing gap and the thrust bearing gap being filled with lubricating oil, the bearing member being supported respectively in a radial direction and a thrust direction by an oil film to be formed in the radial bearing gap and an oil film to be formed in the thrust bearing gap, the fluid dynamic bearing device having an axial gap containing air, the axial gap being formed between the end surface of the bearing member on the another side in the axial direction and an end surface of the sealing member, which faces the end surface of the bearing member on the another side in the axial direction.

In the fluid dynamic bearing device according to one embodiment of the present invention (hereinafter also simply referred to as "bearing device"), in the situation where the radial bearing gap and the thrust bearing gap are filled with the lubricating oil, the axial gap containing the air is formed between the end surface of the bearing member on the another side in the axial direction and the end surface of the sealing member, which faces the end surface of the bearing member on the another side in the axial direction. In other words, in the above-mentioned situation, an oil level of the lubricating oil can be maintained within a range of the axial gap. In this case, an amount of the lubricating oil filled in an interior space of the housing can be reduced to be smaller than a volume of the interior space of the housing (total sum of volumes of not only both the radial bearing gap and the thrust bearing gap but also gaps to be formed between the bearing member and the sealing member). With this, only by carrying out a simple operation of oil injection to the interior space of the housing through the sealing gap with an oil dispenser such as a micropipette after assembly of the bearing device, a necessary amount of the lubricating oil can be filled in the interior space of the housing. Thus, operations to adjust and manage the oil level with high accuracy need not be carried out, with the result that the bearing device can be manufactured at low cost.

In the above-mentioned configuration, the bearing member may have an external force applied thereto so that the bearing member is forced to the one side in the axial direction. With this, the bearing member can be supported in both thrust directions, and hence it is possible to avoid as much as possible a risk that load supportability in the one thrust direction by the oil film to be formed in the thrust bearing gap becomes excessively higher to disturb support accuracy in the thrust directions. Further, in the configuration of Patent Literature 1, load in another thrust direction is supported with the thrust bearing portion formed of the fluid dynamic bearing, and hence a gap width of the thrust bearing gap in each of the thrust bearing portions needs to be adjusted and managed with high accuracy. However, in the configuration of the present invention, such operations of adjustment and management need not be carried out. Thus, the bearing device can be manufactured at low cost, and bearing performance can be enhanced.

As an example of the external force described above, a magnetic force may be applied. This magnetic force can be applied, for example, by arranging, with a shift in the axial direction, stator coils provided to a holding member (motor base) for holding, on its inner periphery, the housing on the stationary side, and a rotor magnet provided to the bearing member on the rotary side. Normally, motors having built therein the fluid dynamic bearing device of this type comprise, as essential components, the rotor magnet and the stator coils. Thus, when the above-mentioned configuration is employed, the external force can be inexpensively applied without involving a significant cost increase.

In the above-mentioned configuration, the fluid dynamic bearing device may further comprise a pump-in portion for pumping, during rotation of the bearing member, the lubricating oil in the axial gap in a direction in which the lubricating oil in the axial gap is radially separated from the sealing gap. With this, not only leakage of the lubricating oil through the sealing gap during the rotation of the bearing member (during operation of the bearing device), but also resultant deterioration in bearing performance can be prevented as much as possible.

For example, the pump-in portion may comprise a plurality of groove portions formed in at least one of the two opposed surfaces forming the axial gap. However, in view of satisfactory processability of the bearing member made of the porous material, it is desired that the pump-in portion comprise a plurality of groove portions formed in the end surface of the bearing member on the another side in the axial direction.

It is desired that a groove width of each of the plurality of groove portions of the pump-in portion be gradually reduced in a direction in which the plurality of groove portions are radially separated from the sealing gap. This is because a capillary force is generated to facilitate the lubricating oil in the axial gap to be retained at a position radially spaced apart from the sealing gap, which is advantageous in preventing the leakage of the lubricating oil through the sealing gap. Further, it is desired that the each of the plurality of groove portions of the pump-in portion have such a sectional shape that the groove width is gradually reduced toward a groove bottom side. This is because a capillary force is generated to allow the lubricating oil in the axial gap to be drawn to the groove bottom side of the plurality of groove portions (side spaced axially apart from the sealing gap), which is further advantageous in preventing the leakage of the lubricating oil through the sealing gap.

In the above-mentioned configuration, the sealing gap may be formed between an outer peripheral surface of a shaft member having the bearing member fixed onto an outer periphery thereof and an inner peripheral surface of the sealing member formed integrally with or separately from the housing. In this case, the radial bearing gap can be formed on a radially outer side with respect to the sealing gap. Thus, when the pump-in portion comprises the plurality of groove portions, and the groove width of the each of the plurality of groove portions is gradually reduced in the direction in which the plurality of groove portions are radially separated from the sealing gap, the lubricating oil filled in the axial gap is more easily drawn into the radial bearing gap when the bearing member is stopped and rotated. With this, the radial bearing gap can be filled with an ample amount of the lubricating oil, and rotational accuracy in the radial direction can be stabilized.

In the above-mentioned configuration, on any one or both of the inner peripheral surface of the housing and the outer peripheral surface of the bearing member, which face each other across the radial bearing gap, a dynamic pressure generating portion (radial dynamic pressure generating portion) for causing a dynamic pressure generating action in the lubricating oil in the radial bearing gap may be formed.

It is preferred that the radial dynamic pressure generating portion be formed into a shape of causing the lubricating oil in the radial bearing gap to be pumped into the thrust bearing gap side during the rotation of the bearing member. This is because shortage of the oil film in the thrust bearing gap can be prevented as much as possible, and thus rotational accuracy in the one thrust direction can be stabilized.

The bearing member may comprise a communication path for communicating both the end surfaces of the bearing member to each other. When such a communication path is formed in advance, during the operation of the bearing device, the lubricating oil filled in the interior space of the housing can be caused to actively flow and circulate. Thus, deterioration in bearing performance, which may be caused by a pressure imbalance in the bearing device or the shortage of the lubricating oil in each of the bearing gaps, can be effectively prevented.

As described above, the fluid dynamic bearing device according to one embodiment of the present invention has the above-mentioned various features. Thus, the fluid dynamic bearing device can be suitably used by being built in various motors such as a fan motor for PCs and a spindle motor for disk drives, and can also contribute to cost reduction of those various motors.

Advantageous Effects of Invention

As described above, according to one embodiment of the present invention, it is possible to provide the fluid dynamic bearing device that can be manufactured at low cost and exert desired bearing performance.

DESCRIPTION OF EMBODIMENTS

Now, description is made of embodiments of the present invention with reference to the drawings.

Figure 1:
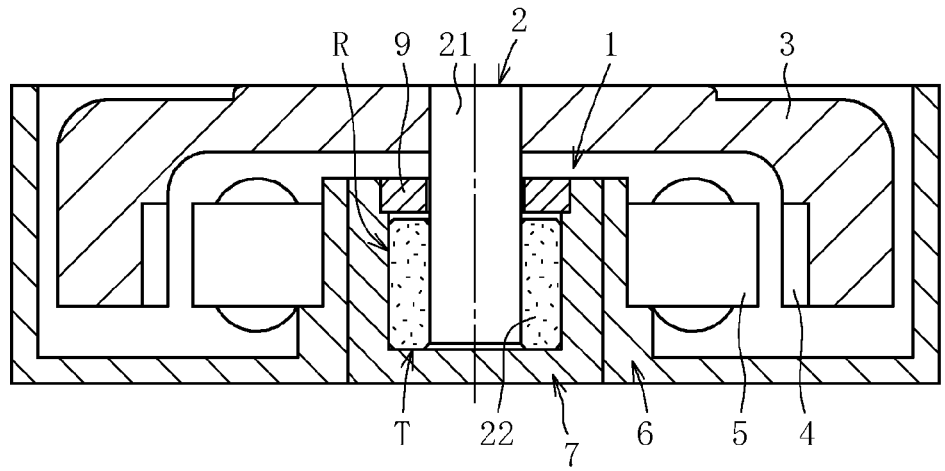
FIG. 1 is a schematic sectional view of a structural example of a fan motor.

FIG. 1 schematically illustrates a structural example of a fan motor having built therein a fluid dynamic bearing device 1 according to the present invention. The fan motor illustrated in FIG. 1 comprises the fluid dynamic bearing device 1, a motor base 6 serving as a holding member on a stationary side of the motor, stator coils 5 mounted to the motor base 6, a rotor 3 serving as a rotary member and comprising blades (not shown), and a rotor magnet 4 being mounted to the rotor 3 and facing the stator coils 5 across a radial gap. A housing 7 of the fluid dynamic bearing device 1 is fixed to an inner periphery of the motor base 6, and the rotor 3 is fixed to one end of a shaft member 21 of the fluid dynamic bearing device 1. In the fan motor having such a structure, when the stator coils 5 are energized, an electromagnetic force is generated between the stator coils 5 and the rotor magnet 4 so as to cause the rotor magnet 4 to rotate. In conjunction therewith, a rotator 2 comprising the shaft member 21, the rotor 3 comprising the blades and being fixed to the shaft member 21, and the rotor magnet 4 fixed to the rotor 3 is rotated.

Figure 2:
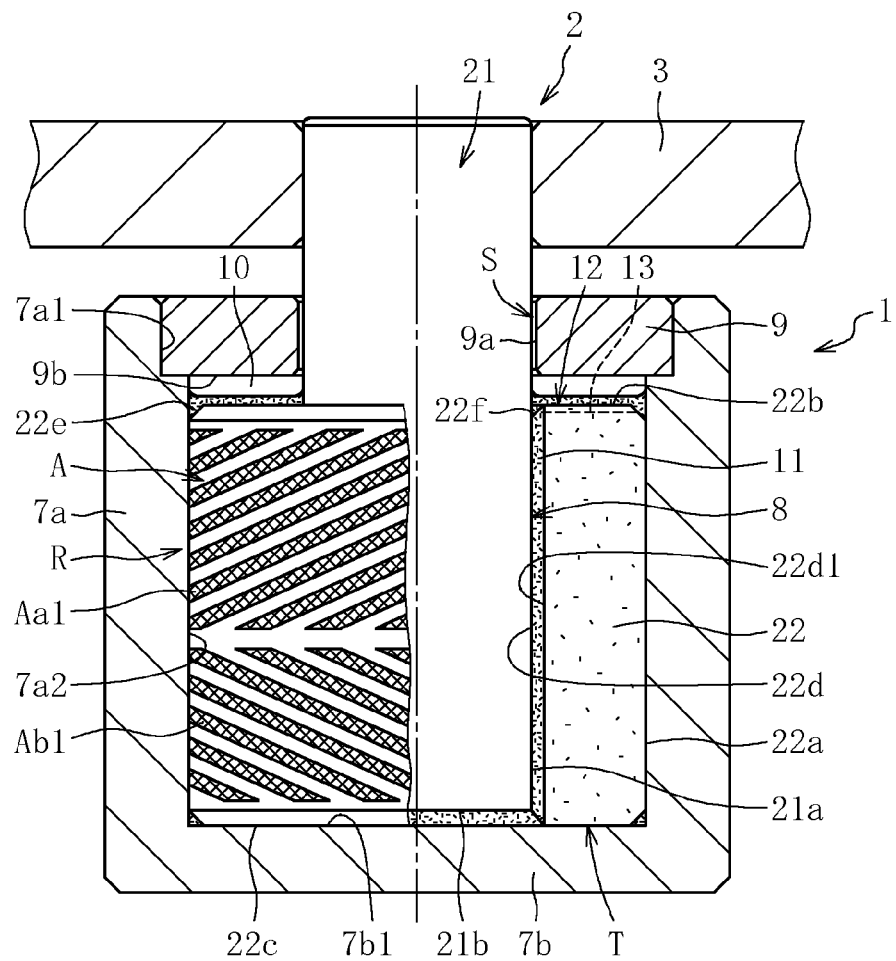
FIG. 2 is a sectional view of a fluid dynamic bearing device according to a first embodiment of the present invention.

Note that, when the rotator 2 is rotated, wind is blown upward or downward in FIG. 2 depending on a form of the blades provided to the rotor 3. Thus, during rotation of the rotator 2, a reactive force of this blowing action is applied as an upward or downward thrust force in FIG. 1 to the shaft member 21 of the fluid dynamic bearing device 1 and a bearing member 22 fixed to its outer periphery. In a region between the stator coils 5 and the rotor magnet 4, a magnetic force (repulsive force) is applied in a direction in which the thrust force is counterbalanced. A thrust load, which is generated by a difference in magnitude between the thrust force and the magnetic force, is supported by a thrust bearing portion T of the fluid dynamic bearing device 1. The magnetic force in the direction in which the thrust force is counterbalanced can be generated, for example, by arranging the stator coils 5 and the rotor magnet 4 with a shift in the axial direction (not shown in detail). Further, during the rotation of the rotator 2, a radial load is applied to the shaft member 21 and the bearing member 22 of the fluid dynamic bearing device 1. This radial load is supported by a radial bearing portion R of the fluid dynamic bearing device 1.

FIG. 2 illustrates the fluid dynamic bearing device 1 according to a first embodiment of the present invention. This fluid dynamic bearing device 1 comprises, as main components, the shaft member 21 on a rotary side, the bearing member 22 fixed to its outer periphery, the housing 7 on the stationary side, which has a bottomed cylindrical shape closed on one side in the axial direction and is configured to receive the bearing member 22 and the shaft member 21 on its inner periphery, and a sealing member 9 arranged so as to face an end surface of the bearing member 22 on another side in the axial direction and configured to open another side of the bearing member 22 in the axial direction to the atmosphere through a sealing gap S. An interior space of the housing 7 is filled with lubricating oil 11 (indicated by densely dotted hatching). Under the state illustrated in FIG. 2, at least a radial bearing gap in the radial bearing portion R and a thrust bearing gap in the thrust bearing portion T are filled with the lubricating oil 11. Note that, for the sake of convenience of description, a side on which the sealing member 9 is arranged is hereinafter referred to as upper side, and an opposite side in the axial direction is hereinafter referred to as lower side.

The housing 7 has the bottomed cylindrical shape comprising a circular cylindrical portion 7a and a bottom portion 7b closing a lower end opening of the cylindrical portion 7a. In this case, the cylindrical portion 7a and the bottom portion 7b are integrally made of a metal or a resin. An inner peripheral surface of the cylindrical portion 7a is partitioned by a step portion into a large-diameter inner peripheral surface 7a1 and a small-diameter inner peripheral surface 7a2. The sealing member 9 is fixed to the large-diameter inner peripheral surface 7a1. The radial bearing gap is formed between a cylindrical region of the small-diameter inner peripheral surface 7a2 and an outer peripheral surface 22a of the bearing member 22 fixed to the shaft member 21. This cylindrical region is formed into an even and smooth surface. Further, the thrust bearing gap is formed between an annular region of an inner bottom surface 7b1 of the bottom portion 7b and a lower end surface 22c of the bearing member 22. This annular region is formed into an even and smooth surface.

The sealing member 9 is obtained by forming a metal or a resin into an annular shape, and fixed to the large-diameter inner peripheral surface 7a1 of the housing 7 by appropriate means such as bonding, press fitting, and press-fit bonding. The sealing gap (labyrinth seal) S is formed between an inner peripheral surface 9a of the sealing member 9 and an outer peripheral surface 21a of the shaft member 21 opposed thereto. An upper side of the bearing member 22 is open to the atmosphere through the sealing gap S.

The shaft member 21 is made of a metal material such as stainless steel, and the outer peripheral surface 21a thereof is formed into a smooth cylindrical surface. The rotor 3 having the blades is fixed to an outer periphery of an upper end of the shaft member 21.

The bearing member 22 is obtained by forming a porous body, specifically, a porous body of a sintered metal containing, as a main component, metal powder of copper (including a copper-based alloy) or iron (including an iron-based alloy) into a cylindrical shape. The bearing member 22 need not be made of the porous body of the sintered metal, and may be made of other porous bodies such as a porous resin. The bearing member 22 is fixed to the outer peripheral surface 21a of the shaft member 21 by appropriate means such as press fitting, bonding, press-fit bonding (combination of press fitting and bonding), and welding in a manner that the lower end surface 22c is located on an outside (lower side) in the axial direction with respect to a lower end surface 21b of the shaft member 21.

The bearing member 22 comprises one or a plurality of communication paths 8 for communicating both end surfaces 22b and 22c to each other. In this case, as illustrated in FIGS.

3 and 4, the communication paths 8 are formed of axial grooves 22d1 formed in an inner peripheral surface 22d of the bearing member 22, and the smooth cylindrical outer peripheral surface 21a of the shaft member 21. As a matter of course, the communication paths 8 may be formed of axial grooves formed in the outer peripheral surface 21a of the shaft member 21.

On the outer peripheral surface 22a of the bearing member 22, there is formed a cylindrical radial bearing surface for forming the radial bearing gap between the cylindrical radial bearing surface and the small-diameter inner peripheral surface 7a2 of the housing 7 opposed thereto. On the radial bearing surface, there is formed a dynamic pressure generating portion (radial dynamic pressure generating portion) A for causing a dynamic pressure generating action in the lubricating oil 11 in the radial bearing gap. In the radial dynamic pressure generating portion A, a plurality of dynamic pressure generating grooves Aa1 and Ab1 that are inclined in directions opposite to each other and spaced apart from each other in the axial direction are arrayed in a herringbone pattern. In the radial dynamic pressure generating portion A, an axial dimension of the upper dynamic pressure generating grooves Aa1 is larger than an axial dimension of the lower dynamic pressure generating grooves Ab1. With this, during the rotation of the rotator 2 (shaft member 21 and bearing member 22), the lubricating oil 11 filled in the radial bearing gap is pumped downward (thrust bearing gap side in the thrust bearing portion T).

Note that, the dynamic pressure generating grooves of the radial dynamic pressure generating portion A may be molded simultaneously with molding of the bearing member 22 (specifically, simultaneously with molding of the bearing member 22 into a final size and dimensions by a sizing process on a cylindrical bearing preform obtained by compacting and sintering metal powder), or may be formed by plastic working such as rolling on a bearing preform having a smooth outer peripheral surface in view of satisfactory processability of the sintered metal. Further, a mode of forming the radial dynamic pressure generating portion A (dynamic pressure generating grooves) is not limited thereto. For example, in the radial dynamic pressure generating portion A, a plurality of dynamic pressure generating grooves may be arrayed in a spiral pattern in a circumferential direction.

Figure 3:
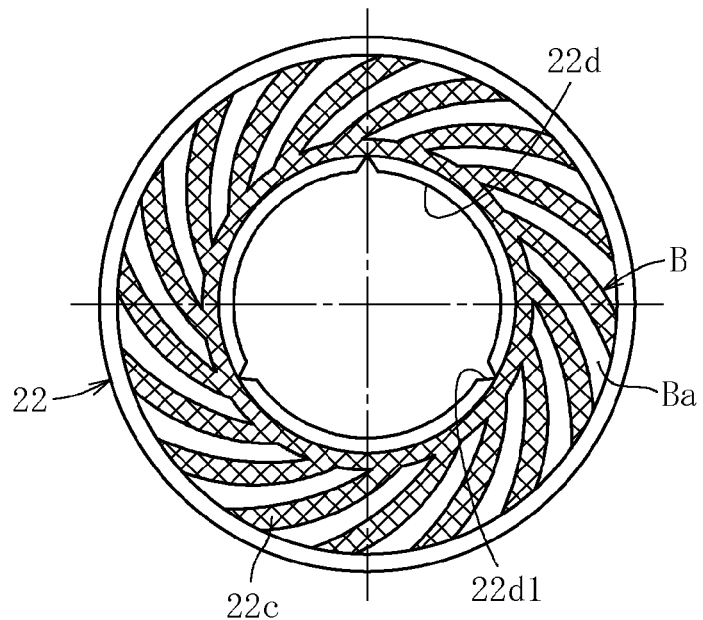
FIG. 3 is a plan view of a lower end surface of a bearing member illustrated in FIG. 2.

As illustrated in FIG. 3, on the lower end surface 22c of the bearing member 22, there is formed an annular thrust bearing surface for forming the thrust bearing gap in the thrust bearing portion T between the annular thrust bearing surface and the inner bottom surface 7b1 of the housing 7 opposed thereto. On the thrust bearing surface, there is formed a thrust dynamic pressure generating portion B for causing a dynamic pressure generating action in the lubricating oil 11 in the thrust bearing gap along with the rotation of the shaft member 21 and the bearing member 22. The thrust dynamic pressure generating portion B comprises a plurality of dynamic pressure generating grooves Ba formed at a predetermined interval in a spiral pattern in the circumferential direction, and has a pump-in function to pump the lubricating oil 11 in the thrust bearing gap toward a radially inner side during the rotation of the shaft member 21 and the bearing member 22. The thrust dynamic pressure generating portion B may comprise dynamic pressure generating grooves that are arranged in a herringbone pattern at a predetermined interval in the circumferential direction.

In a region between the upper end surface 22b of the bearing member 22 and a lower end surface 9b of the sealing member 9 opposed thereto, an axial gap (annular space) 10 containing air is formed. Under a state in which the fluid dynamic bearing device 1 is arranged in a posture illustrated in FIG. 2 (state in which the sealing gap S is arranged on the upper side in a vertical direction), at least the radial bearing gap in the radial bearing portion R and the thrust bearing gap in the thrust bearing portion T are filled with the lubricating oil 11. An oil level of the lubricating oil 11 filled in the interior space of the housing 7 is maintained within a range of the axial gap 10.

Thus, in the fluid dynamic bearing device 1, an amount (volume) of the lubricating oil 11 filled in the interior space of the housing 7 is smaller than a volume of the interior space of the housing 7.

Figure 4:
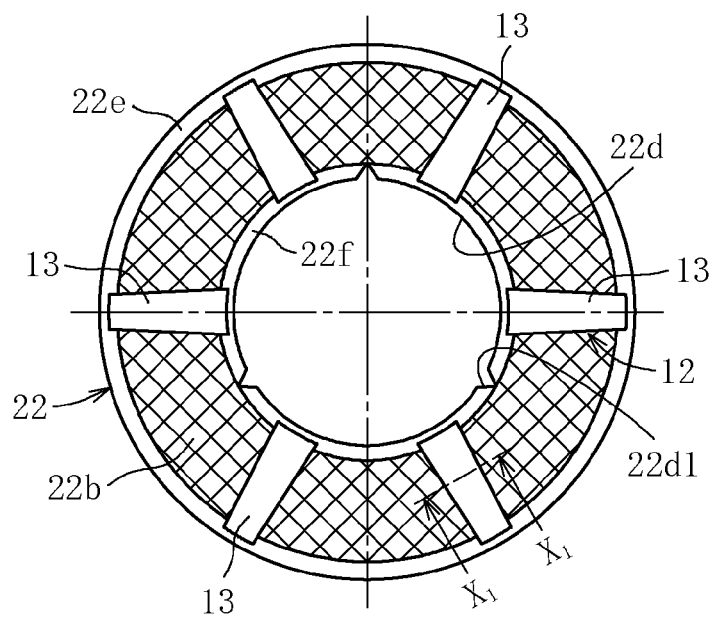
FIG. 4 is a plan view of an upper end surface of the bearing member illustrated in FIG. 2.
Figure 5A:
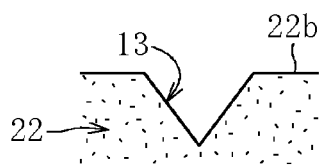
FIG. 5a is a sectional view taken along the arrows $X_1$-$X_1$ in FIG. 4, for illustrating an example of a groove portion formed in the upper end surface of the bearing member.
Figure 5B:
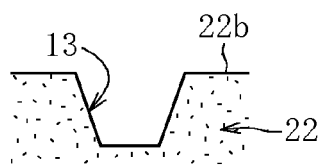
FIG. 5b is a sectional view of a modification of the groove portion formed in the upper end surface of the bearing member.
Figure 5C:
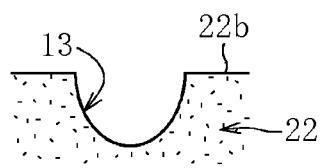
FIG. 5c is a sectional view of another modification of the groove portion formed in the upper end surface of the bearing member.

On the upper end surface 22b of the bearing member 22, there is formed a pump-in portion 12 for pumping, during the rotation of the shaft member 21 and the bearing member 22, the lubricating oil 11 in the axial gap 10 in a direction in which the lubricating oil 11 is radially separated from the sealing gap S (radially outer side in this embodiment). As illustrated in FIG. 4, in the pump-in portion 12, a plurality of groove portions 13 are arranged at a predetermined interval in the circumferential direction. In this embodiment, the groove portions 13 comprise radial grooves extending in the radial direction. The groove portions 13 each have a form gradually reduced in groove width toward the radially outer side (in a direction in which the groove portions 13 are radially separated from the sealing gap S), and have such a sectional shape that the groove width is gradually reduced toward a groove bottom side. Note that, as the sectional shape of the groove portions 13, there may be employed not only the triangular shape in cross-section illustrated in FIG. 5a but also, for example, the trapezoidal shape in cross-section illustrated in FIG. 5b, or the semi-circular shape in cross-section illustrated in FIG. 5c.

A radially outer end portion and a radially inner end portion of each of the groove portions 13 are open respectively in an upper end outer circumferential chamfer 22e and an upper end inner circumferential chamfer 22f of the bearing member 22, and a groove depth of the groove portions 13 is set to be smaller than a chamfering amount of the upper end outer circumferential chamfer 22e. For example, when the chamfering amount of the upper end outer circumferential chamfer 22e is set to 0.2 mm, the groove depth of the groove portions 13 is set to approximately 0.15 mm. This is because, when the groove depth of the groove portions 13 is larger than the chamfering amount of the upper end outer circumferential chamfer 22e, the radial dynamic pressure generating portion A formed on the outer peripheral surface 22a of the bearing member 22 (in particular, the upper dynamic pressure generating grooves Aa1) may be deformed, and supportability of the radial bearing portion R may be adversely affected.

The dynamic pressure generating grooves Ba and the groove portions 13 formed respectively in the lower end surface 22c and the upper end surface 22b of the bearing member 22 may be molded simultaneously with molding of the bearing member 22 (specifically, simultaneously with molding of the bearing member 22 into final dimensions and a final size by a sizing process on a bearing preform obtained by compacting and sintering metal powder), or may be formed by plastic working such as pressing on a bearing preform having smooth both end surfaces in view of satisfactory processability of the sintered metal.

The fluid dynamic bearing device 1 constructed as described above is completed, for example, by inserting the shaft member 21 and the bearing member 22 fixed to its outer periphery along the inner periphery of the housing 7, fixing the sealing member 9 to the large-diameter inner peripheral surface 7a1 of the housing 7, and then filling (injecting) the lubricating oil 11 to the interior space of the housing 7 through the sealing gap S with an oil dispenser such as a micropipette.

In the fluid dynamic bearing device 1 constructed as described above, along with the rotation of the shaft member 21 and the bearing member 22, the radial bearing gap is formed between the radial bearing surface formed on the outer peripheral surface 22a of the bearing member 22 and the small-diameter inner peripheral surface 7a2 of the housing 7 opposed thereto. Then, along with the rotation of the shaft member 21 and the bearing member 22, a pressure of an oil film formed in the radial bearing gap is increased by the dynamic pressure generating action in the radial dynamic pressure generating portion A, and the radial bearing portion R in which the shaft member 21 and the bearing member 22 are supported in a non-contact manner in the radial direction is formed.

Simultaneously, the thrust bearing gap is formed between the thrust bearing surface formed on the lower end surface 22c of the bearing member 22 and the inner bottom surface 7b1 of the housing 7 opposed thereto. Then, along with the rotation of the shaft member 21 and the bearing member 22, a pressure of an oil film in the thrust bearing gap is increased by the dynamic pressure generating action in the thrust dynamic pressure generating portion B, and the thrust bearing portion T in which the shaft member 21 and the bearing member 22 are supported in a non-contact manner in one of thrust directions (supported upward in a floating manner) is formed. Note that, as described with reference to FIG. 1, a magnetic force is applied to the shaft member 21 and the bearing member 22 as an external force for forcing downward those members. With this, the shaft member 21 and the bearing member 22 are prevented from being excessively floated.

As described above, during the rotation of the shaft member 21 and the bearing member 22, the lubricating oil 11 in the radial bearing gap is pumped downward. With this, during the rotation of the bearing member 22, the lubricating oil 11 filled in the gap between the outer peripheral surface 22a of the bearing member 22 and the inner peripheral surface 7a2 of the housing 7 is caused to flow downward and circulate through the path formed by the thrust bearing gap in the thrust bearing portion T, the communication paths 8 formed in the bearing member 22, and the axial gap 10 between the upper end surface 22b of the bearing member 22 and the lower end surface 9b of the sealing member 9 in the stated order so that the lubricating oil 11 is re-drawn into the radial bearing gap in the radial bearing portion R. In particular, in this embodiment, the thrust dynamic pressure generating portion B has the pump-in function to pump the lubricating oil 11 in the thrust bearing gap toward the radially inner side. Further, on the upper end surface 22b of the bearing member 22, the pump-in portion 12 (plurality of groove portions 13) having a pump-out function to pump the lubricating oil 11 in the axial gap 10 toward the radially outer side is formed. Thus, the lubricating oil 11 is caused to more actively flow and circulate. Such a configuration enables pressure balance in the interior space of the housing 7 to be maintained, and simultaneously, prevents shortage of the oil film in the radial bearing gap in the radial bearing portion R and the thrust bearing gap in the thrust bearing portion T. As a result, bearing performance can be stabilized.

As described above, in the fluid dynamic bearing device 1 according to the present invention, in the situation where the radial bearing gap and the thrust bearing gap are filled with the lubricating oil 11 (FIG. 2), the axial gap 10 containing air is formed between the upper end surface 22b of the bearing member 22 and the lower end surface 9b of the sealing member 9 opposed thereto. In other words, in the above-mentioned situation, the oil level of the lubricating oil 11 can be maintained within the range of the axial gap 10. In this case, the amount of the lubricating oil 11 filled in the interior space of the housing 7 can be reduced to be smaller than the volume of the interior space of the housing 7 (total sum of volumes of not only both the bearing gaps but also gaps to be formed between the two members and volumes of internal pores of the bearing member 22 made of the sintered metal). With this, only by carrying out a simple operation of oil injection to the interior space of the housing 7 through the sealing gap S with the oil dispenser such as the micropipette after assembly of the bearing device 1, a necessary amount of the lubricating oil 11 can be filled in the interior space of the housing 7. As a result, the oil level need not be managed with high accuracy.

Further, the external force for forcing the bearing member 22 downward (supporting the bearing member 22 in another thrust direction) is applied to the bearing member 22. With this, the bearing member 22 can be supported in both the thrust directions, and hence it is possible to avoid as much as possible a risk that load supportability in the one thrust direction by the oil film to be formed in the thrust bearing gap becomes excessively higher to disturb support accuracy (rotational accuracy) in the thrust directions. In this embodiment, the external force applied as described above is a magnetic force, and this magnetic force is applied by arranging, with a shift in the axial direction, the stator coils 5 provided to the motor base 6 for holding, on its inner periphery, the housing 7 on the stationary side, and the rotor magnet 4 provided to the bearing member 22 on the rotary side. Motors having built therein the fluid dynamic bearing device 1 of this type comprise, as essential components, the rotor magnet 4 and the stator coils 5. Thus, when the above-mentioned configuration is employed, the external force can be inexpensively applied without involving a significant cost increase.

Note that, an oil level of the lubricating oil 11 is maintained within the axial gap 10, and hence the operation of oil injection to the interior space of the housing 7 may be carried out prior to fixation of the sealing member 9 to the housing 7. With this, the operation of oil injection can be simplified in comparison with that in the case where the lubricating oil 11 is filled into the interior space of the housing 7 through the sealing gap S after the fixation of the sealing member 9.

In the configuration of the fluid dynamic bearing device 1 according to the present invention, for example, in a case where the bearing device 1 in the posture illustrated in FIG. 2 is used upside down, the lubricating oil 11 is somewhat more liable to leak out to an outside through the sealing gap S. As described above, such a problem can be effectively prevented, for example, by taking the measures of (1) forming the pump-in portion 12 for pumping, during the rotation of the shaft member 21 and the bearing member 22, the lubricating oil 11 in the axial gap 10 in the direction in which the lubricating oil 11 is radially separated from the sealing gap S (radially outer side in this embodiment), (2) forming the pump-in portion 12 with the plurality of groove portions 13 that are formed in the upper end surface 22b of the bearing member 22, and gradually reducing the groove width of the groove portions 13 in a direction in which the groove portions 13 are radially separated from the sealing gap S, and (3) forming the groove portions 13 of the pump-in portion 12 into such a sectional shape that the groove width is gradually reduced toward the groove bottom side.

Specifically, when the measure (2) is taken, a capillary force is generated to facilitate the lubricating oil 11 in the axial gap 10 to be retained at a position radially spaced apart from the sealing gap S. Further, when the measure (3) is taken, a capillary force is generated to allow the lubricating oil in the axial gap 10 to be drawn to the groove bottom side of the groove portions 13 (side spaced axially apart from the sealing gap S).

Note that, although not shown, in order to more effectively prevent the leakage of the lubricating oil through the sealing gap S, an oil repellent film may be formed on the outer peripheral surface 21a of the shaft member 21 or an upper end surface of the sealing member 9, which is adjacent to the sealing gap S and exposed to the atmosphere.

Further, as in this embodiment, when the sealing gap S is formed between the outer peripheral surface 21a of the shaft member 21 and the inner peripheral surface 9a of the sealing member 9 fixed to the housing 7, the radial bearing gap can be formed on the radially outer side with respect to the sealing gap S. In addition, the pump-in portion 12, which comprises the plurality of groove portions 13 in the form described above and is formed on the upper end surface 22b of the bearing member 22, facilitates the lubricating oil 11 filled in the axial gap 10 to be drawn into the radial bearing gap in the radial bearing portion R when the shaft member 21 and the bearing member 22 are stopped and rotated. With this, the radial bearing gap in the radial bearing portion R can be always filled with an ample amount of the lubricating oil 11, and thus rotational accuracy in the radial direction can be stabilized.

The fluid dynamic bearing device 1 according to the embodiment of the present invention is described above, and various modifications may be made to each part of the fluid dynamic bearing device 1 without departing from the gist of the present invention.

Figure 6:
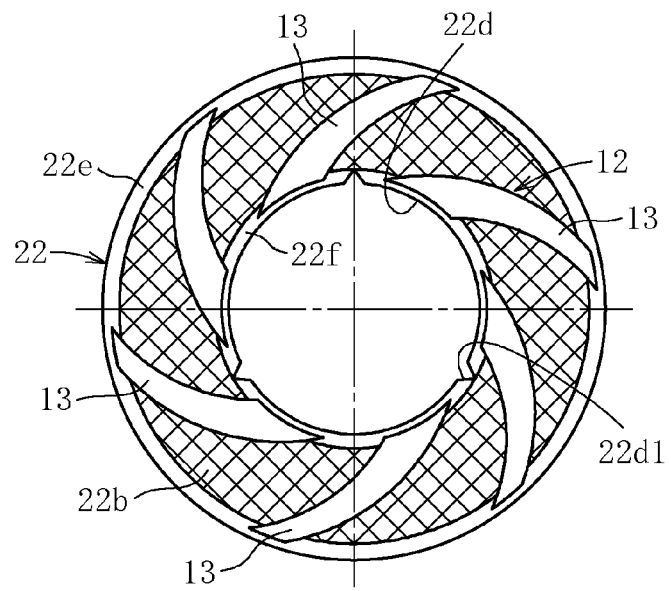
FIG. 6 is a plan view of an upper end surface of a bearing member according to a modification of the present invention.

For example, the plurality of groove portions 13 of the pump-in portion 12 may be formed in a spiral pattern as illustrated in FIG. 6. The groove portions 13 in the spiral pattern each have a cross-sectional area (volume) larger than that of each of the radial groove portions 13 illustrated in FIG. 4. Thus, a larger amount of the lubricating oil 11 can be filled (retained) in the axial gap 10, which is advantageous in enhancing bearing performance.

Figure 7:
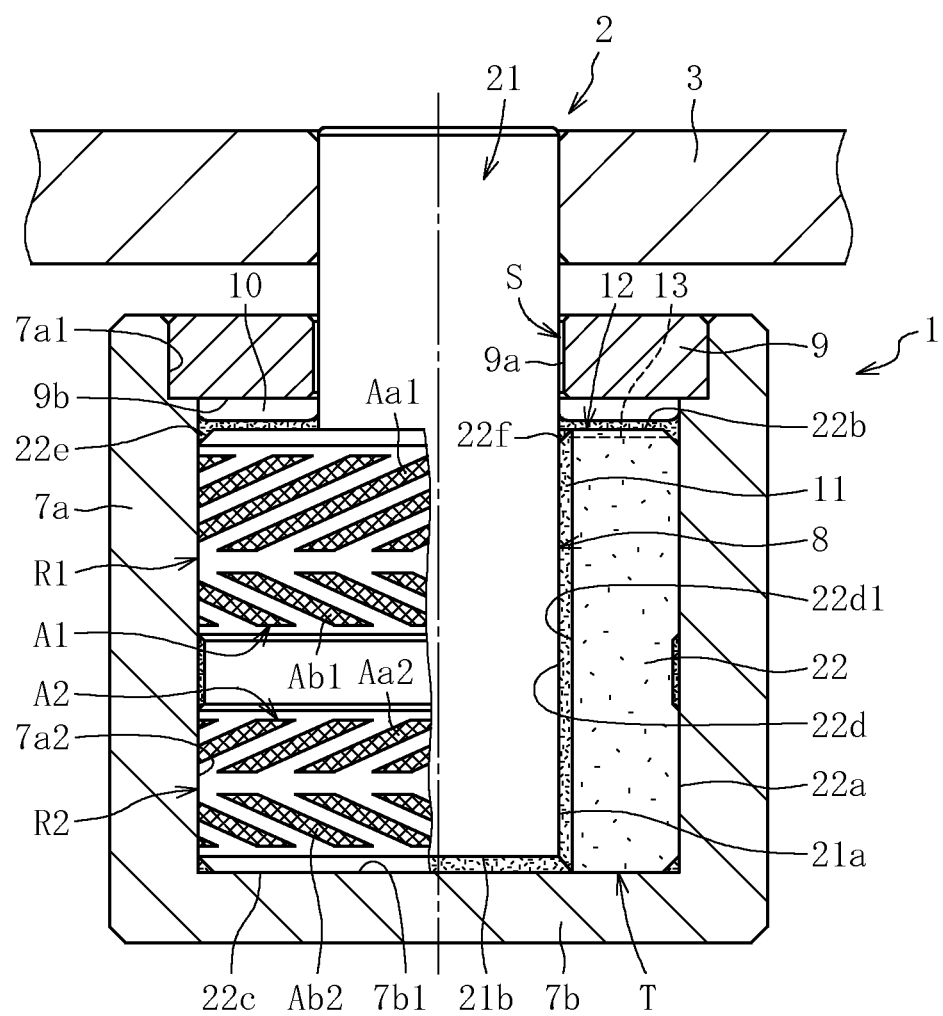
FIG. 7 is a sectional view of a fluid dynamic bearing device according to a second embodiment of the present invention.

Further, as illustrated in FIG. 7, radial bearing portions for supporting the shaft member 21 and the bearing member 22 in the radial direction may be formed at two positions spaced apart from each other in the axial direction (radial bearing portions R1 and R2). In FIG. 7, at two positions in the axial direction on the outer peripheral surface 22a of the bearing member 22, there are formed cylindrical radial bearing surfaces for forming radial bearing gaps between the cylindrical radial bearing surfaces and the small-diameter inner peripheral surface 7a2 of the housing 7 opposed thereto. On the two radial bearing surfaces, there are respectively formed dynamic pressure generating portions (radial dynamic pressure generating portions) A1 and A2 for causing a dynamic pressure generating action in the lubricating oil 11 in the radial bearing gaps. In the radial dynamic pressure generating portion A1 formed on the upper radial bearing surface, the plurality of dynamic pressure generating grooves Aa1 and Ab1 that are inclined in directions opposite to each other and spaced apart from each other in the axial direction are arrayed in a herringbone pattern. In the radial dynamic pressure generating portion A2 formed on the lower radial bearing surface, a plurality of dynamic pressure generating grooves Aa2 and Ab2 that are inclined in directions opposite to each other and spaced apart from each other in the axial direction are arrayed in a herringbone pattern. In the upper radial dynamic pressure generating portion A1, the axial dimension of the upper dynamic pressure generating grooves Aa1 is larger than the axial dimension of the lower dynamic pressure generating grooves Ab1. Meanwhile, in the lower radial dynamic pressure generating portion A2, an axial dimension of the upper dynamic pressure generating grooves Aa2 and an axial dimension of the lower dynamic pressure generating grooves Ab2 are equal to each other, and each of the axial dimensions is equal to the axial dimension of the lower dynamic pressure generating grooves Ab1 of the upper radial dynamic pressure generating portion A1. With this, during the rotation of the rotator 2 (shaft member 21 and bearing member 22), the lubricating oil 11 filled in the gap (radial bearing gap) between the outer peripheral surface 22a of the bearing member 22 and the small-diameter inner peripheral surface 7a2 of the housing 7 is pumped into the thrust bearing gap side in the thrust bearing portion T.

Figure 8:
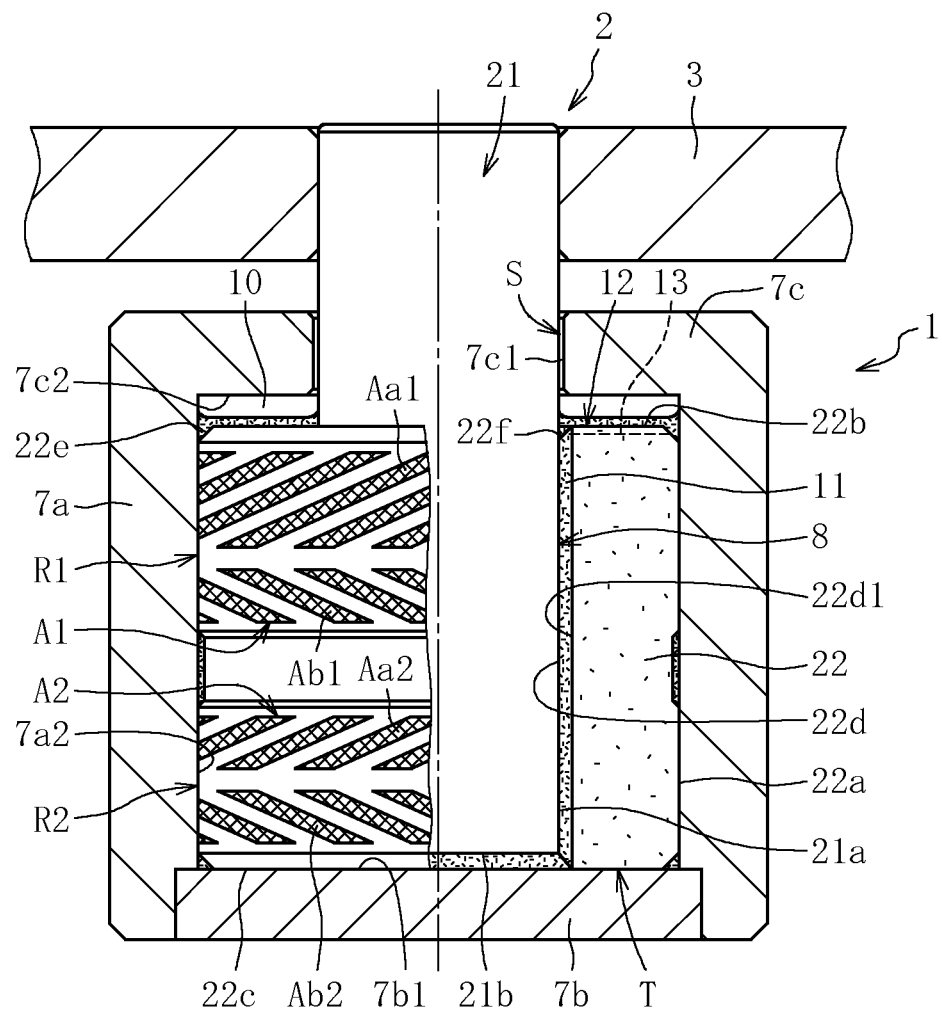
FIG. 8 is a sectional view of a fluid dynamic bearing device according to a third embodiment of the present invention.

Further, in the housing 7 used in the embodiment described above, the cylindrical portion 7a and the bottom portion 7b closing the lower end opening of the cylindrical portion 7a are formed integrally with each other, and the sealing gap S sealing an upper end opening of the housing 7 is formed with the inner peripheral surface 9a of the sealing member 9 fixed to the inner peripheral surface of the housing 7 (cylindrical portion 7a). However, as the housing 7 to be used herein, as illustrated in FIG. 8, the cylindrical portion 7a and the bottom portion 7b closing the lower end opening thereof may be provided as separate members. Instead, in FIG. 8, a sealing portion 7c for forming the sealing gap S between the sealing portion 7c and the outer peripheral surface 21a of the shaft member 21 is formed integrally with the cylindrical portion 7a. Note that, such a configuration is applicable also to the fluid dynamic bearing device 1 illustrated in FIG. 2.

Still further, in the embodiment described above, the housing 7 provided separately from the motor base 6 is fixed to the inner periphery of the motor base 6. However, a part corresponding to the motor base 6 may be formed integrally with the housing 7 (not shown).

Yet further, in the embodiment described above, the radial dynamic pressure generating portions A, A1, and A2 are formed on the outer peripheral surface 22a of the bearing member 22 in view of satisfactory processability of the bearing member 22 made of a porous body. However, the radial dynamic pressure generating portion may be formed on the inner peripheral surface 7a2 of the housing 7 opposed thereto. In addition, the radial bearing portion may be formed of fluid dynamic bearings of other publicly known types, such as what is called a multi-lobe bearing, a step bearing, and a wave bearing. Similarly, the thrust dynamic pressure generating portion B need not be formed on the lower end surface 22c of the bearing member 22 but may be formed on the inner bottom surface 7b1 of the housing 7 opposed thereto. Further, the thrust bearing portion T may be formed of fluid dynamic bearings of other publicly known types, such as what is called a step bearing and a wave bearing.

Yet further, in the embodiment described above, the rotor magnet 4 and the stator coils 5 are arranged with a shift in the axial direction so that the external force (magnetic force) for forcing the bearing member 22 and the shaft member 21 downward (supporting the bearing member 22 and the shaft member 21 in the another thrust direction) is applied to the rotator 2 comprising the bearing member 22. However, means for applying such an external force to the rotator 2 is not limited to that in the above description. For example, although not shown, a magnetic member may be arranged so as to face the rotor magnet 4 in the axial direction so that the magnetic force is applied to the rotator 2 (rotor 3). Alternatively, in a case where the thrust force serving as the reactive force of the blowing action is great enough to cause the bearing member 22 to be forced downward due to the thrust force alone, the magnetic force (magnetic attraction force) serving as the external force for forcing the bearing member 22 downward need not be generated.

Yet further, in the case described above, the present invention is applied to the fluid dynamic bearing device 1 in which the rotor 3 comprising the blades is fixed as a rotary member to the shaft member 21. However, the present invention is suitably applicable also to a fluid dynamic bearing device 1 in which a disk hub having a disk mounting surface or a polygonal mirror is fixed to the shaft member 21 as a rotary member. In other words, the present invention is suitably applicable not only to the fluid dynamic bearing device 1 built in the fan motor as illustrated in FIG. 1 but also to a fluid dynamic bearing device 1 built in other electrical-apparatus motors such as a spindle motor for disk drives, and a polygon scanner motor for laser beam printers (LBPs).

REFERENCE SIGNS LIST 1 fluid dynamic bearing device
2 rotator
3 rotor (rotary member)
4 rotor magnet
5 stator coil
6 motor base (holding member)
7 housing
7a cylindrical portion
7b bottom portion
7b1 inner bottom surface
8 communication path
9 sealing member
10 axial gap
11 lubricating oil
12 pump-in portion
13 groove portion
21 shaft member
22 bearing member
22b upper end surface (end surface on other side in axial direction)
22c lower end surface (end surface on one side in axial direction)
A, A1, A2 radial dynamic pressure generating portion
B thrust dynamic pressure generating portion
S sealing gap
R, R1, R2 radial bearing portion
T thrust bearing portion

The invention claimed is:
1. A fluid dynamic bearing device, comprising:
a bearing member on a rotary side, the bearing member being made of a porous material and having end surfaces on both sides in an axial direction;
a housing on a stationary side, the housing having a bottomed cylindrical shape closed on one side in the axial direction and being configured to receive the bearing member on an inner periphery of the housing;
a sealing member arranged so as to face the end surface of the bearing member on another side in the axial direction and configured to open the another side of the bearing member in the axial direction to atmosphere through a sealing gap;
a radial bearing gap to be formed between an outer peripheral surface of the bearing member and an inner peripheral surface of the housing; and
a thrust bearing gap to be formed between the end surface of the bearing member on one side in the axial direction and an inner bottom surface of the housing,
the radial bearing gap and the thrust bearing gap being filled with lubricating oil,
the bearing member being supported respectively in a radial direction and a thrust direction by an oil film to be formed in the radial bearing gap and an oil film to be formed in the thrust bearing gap,
the fluid dynamic bearing device having an axial gap containing air, the axial gap being formed between the end surface of the bearing member on the another side in the axial direction and an end surface of the sealing member, which faces the end surface of the bearing member on the another side in the axial direction.

2. The fluid dynamic bearing device according to claim 1, wherein the bearing member has an external force applied thereto so that the bearing member is forced to the one side in the axial direction.

3. The fluid dynamic bearing device according to claim 1, further comprising a pump-in portion for pumping, during rotation of the bearing member, the lubricating oil in the axial gap in a direction in which the lubricating oil in the axial gap is radially separated from the sealing gap.

4. The fluid dynamic bearing device according to claim 3, wherein the pump-in portion comprises a plurality of groove portions formed in the end surface of the bearing member on the another side in the axial direction.

5. The fluid dynamic bearing device according to claim 4, wherein a groove width of each of the plurality of groove portions is gradually reduced in a direction in which the plurality of groove portions are radially separated from the sealing gap.

6. The fluid dynamic bearing device according to claim 4, wherein the each of the plurality of groove portions has such a sectional shape that the groove width is gradually reduced toward a groove bottom side.

7. The fluid dynamic bearing device according to claim 1, wherein the sealing gap is formed between an outer peripheral surface of a shaft member having the bearing member fixed onto an outer periphery thereof and an inner peripheral surface of the sealing member formed integrally with or separately from the housing.

8. The fluid dynamic bearing device according to claim 1, further comprising a dynamic pressure generating portion for causing a dynamic pressure generating action in the lubricating oil in the radial bearing gap,
wherein the dynamic pressure generating portion is formed into a shape of causing the lubricating oil in the radial bearing gap to be pumped into the thrust bearing gap side.

9. The fluid dynamic bearing device according to claim 1, further comprising a communication path for communicating the end surfaces of the bearing member on both the sides in the axial direction to each other.

10. A motor, comprising the fluid dynamic bearing device according to claim 1.

* * * * *